US012175872B2

(12) United States Patent
Thompson

(10) Patent No.: US 12,175,872 B2
(45) Date of Patent: Dec. 24, 2024

(54) INTELLIGENT ALTITUDE AND VELOCITY SMOOTHING FOR AIRCRAFT PATHS AND TERRAIN-FOLLOWING ALTITUDE PROFILE GENERATION FOR ROUTE PLANNING

(71) Applicant: The Boeing Company, Chicago, IL (US)

(72) Inventor: Alec Jeffrey Thompson, Martinsburg, WV (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 17/744,031

(22) Filed: May 13, 2022

(65) Prior Publication Data

US 2023/0368679 A1 Nov. 16, 2023

(51) Int. Cl.
*G08G 5/00* (2006.01)
*G05D 1/00* (2024.01)

(52) U.S. Cl.
CPC ............. *G08G 5/003* (2013.01); *G05D 1/042* (2013.01); *G08G 5/006* (2013.01)

(58) Field of Classification Search
CPC ...... G08G 5/003; G08G 5/006; G08G 5/0021; G08G 5/0034; G05D 1/042
See application file for complete search history.

(56) References Cited

U.S. PATENT DOCUMENTS

| | | | |
|---|---|---|---|
| 9,524,647 B2 | 12/2016 | Kohn-Rich | |
| 9,864,368 B2 | 1/2018 | Krupansky et al. | |
| 10,049,584 B2 | 8/2018 | Deittert | |
| 10,636,313 B2 | 4/2020 | Mere | |
| 10,788,325 B1 | 9/2020 | Lenhardt et al. | |
| 11,073,844 B2 | 7/2021 | Mere | |
| 11,137,774 B2 | 10/2021 | De Villele et al. | |
| 2016/0284221 A1 | 9/2016 | Hinkle et al. | |
| 2020/0105147 A1 | 4/2020 | Bailey et al. | |
| 2020/0192405 A1 | 6/2020 | Mere et al. | |
| 2020/0251000 A1 | 8/2020 | Evans et al. | |
| 2021/0183255 A1 | 6/2021 | Van Tulder | |
| 2021/0287556 A1 | 9/2021 | Hong et al. | |
| 2021/0304624 A1 | 9/2021 | Mizufuka et al. | |

FOREIGN PATENT DOCUMENTS

| | | | |
|---|---|---|---|
| CN | 106325294 B | 3/2020 | |
| CN | 111752295 B | 9/2021 | |

OTHER PUBLICATIONS

Extended European Search Report, Application No. 23165819.6, Dated Oct. 12, 2023, 9 Pages.

S. Razzaq, C. Xydeas, M. E. Everett, A. Mahmood and T. Alquthami, "Three-Dimensional UAV Routing With Deconfliction," in IEEE Access, vol. 6, pp. 21536-21551, 2018, doi: 10.1109/ACCESS.2018.2824558.

*Primary Examiner* — Alan D Hutchinson
(74) *Attorney, Agent, or Firm* — Jordan IP Law, LLC

(57) ABSTRACT

Technology identifies a flight path, where the flight path includes a plurality of segments that each include a waypoint, identifies a flight profile that includes one or more of desired velocities or desired altitudes and calculates a first distance from a beginning of the flight path to reach the one or more of the desired velocities or the desired altitudes to comply with a constraint. The technology further identifies a first waypoint from the plurality of waypoints based on the first distance and adjusts the first waypoint to reach the one or more of the desired velocities or the desired altitudes.

20 Claims, 9 Drawing Sheets

INTELLIGENT ALTITUDE AND VELOCITY SMOOTHING FOR AIRCRAFT PATHS AND TERRAIN-FOLLOWING ALTITUDE PROFILE GENERATION FOR ROUTE PLANNING

FIELD

Examples generally relate to an aircraft flight path smoothing process and implementation. More particularly, examples relate to an aircraft flight path smoothing process that smooths an aircraft flight path to conform to a flight profile to comply with constraints (e.g., velocity and/or altitude).

BACKGROUND

Aircrafts can follow predetermined flight paths over widely varying terrains to travel to a destination. For example, a desired altitude and/or velocity at different points can be provided as an input to generate the flight path. The flight path will generally follow the desired altitude and/or desired velocity. In such a case, the flight path can be difficult, if not impossible for the aircraft to follow since the aircraft can have physical limitations that prevent the aircraft from achieving the desired altitudes and/or velocities.

SUMMARY

In accordance with one or more examples, provided is a system comprising a processor, and a memory coupled to the processor. The memory includes a set of instructions, which when executed by the processor, causes the system to identify a flight path, where the flight path includes a plurality of segments that each include a waypoint. The system further identifies a flight profile that includes one or more of desired velocities or desired altitudes, calculates a first distance from a beginning of the flight path to reach the one or more of the desired velocities or the desired altitudes to comply with a constraint associated with an aircraft, identifies a first waypoint from the plurality of waypoints based on the first distance and adjusts the first waypoint to reach the one or more of the desired velocities or the desired altitudes.

In accordance with one or more examples, provided is at least one computer readable storage medium comprising a set of instructions, which when executed by a computing device, cause the computing device to identify a flight path, wherein the flight path includes a plurality of segments that each include a waypoint. The set of instructions, when executed by the computing device, cause the computing device to further identify a flight profile that includes one or more of desired velocities or desired altitudes, calculate a first distance from a beginning of the flight path to reach the one or more of the desired velocities or the desired altitudes to comply with a constraint associated with an aircraft, identify a first waypoint from the plurality of waypoints based on the first distance and adjust the first waypoint to reach the one or more of the desired velocities or the desired altitudes.

In accordance with one or more examples, provided is a method for controlling at least one aircraft comprising identifying a flight path, wherein the flight path includes a plurality of segments that each include a waypoint, identifying a flight profile that includes one or more of desired velocities or desired altitudes, calculating a first distance from a beginning of the flight path to reach the one or more of the desired velocities or the desired altitudes to comply with a constraint associated with an aircraft, identifying a first waypoint from the plurality of waypoints based on the first distance and adjusting the first waypoint to reach the one or more of the desired velocities or the desired altitudes.

BRIEF DESCRIPTION OF THE DRAWINGS

The various advantages of the examples will become apparent to one skilled in the art by reading the following specification and appended claims, and by referencing the following drawings, in which:

DESCRIPTION

Examples relate to a flight path generation and smoothing process that provides an efficient way to generate an efficient flight path based on a desired altitude and velocity profile while also complying with dynamic constraints of an aircraft. Furthermore, the examples can minimize a number of discrete segments in the path and number of iterations to reach a dynamically feasible path tracking the profile, along with the number of iterations to reach the final smoothed state. Moreover, the flight path generation and smoothing process analyzes the segments to determine whether a split of a segment would be beneficial. If the split would be beneficial, the segment is divided into two segments. If the split would not be beneficial, the segment is not divided. Thus, examples avoid excessive segmentation that would not be beneficial. Doing so reduces processing power, reduces latency and increases efficiency while generating the flight path.

In contrast, conventional cases apply simplistic, brute-force approaches trajectory planners can discretize the flight into equal-length segments, up to a maximum number of segments. Doing so does not optimize the flight path since equal-length segments cannot achieve the desired altitudes and/or velocities in shortest time frames possible, results in an unnecessarily high number of segments and inefficiently consumes excessive processing power to generate the high number of segments.

Examples maintain a minimum altitude and/or velocity of an aircraft while reducing the complexity of the smoothened flight path. Further, examples analyze various waypoints along the flight path to generate the smoothened flight path to minimize and/or reduce variances from proposed constraints (e.g., velocity and/or altitude). Doing so provides numerous enhancements. For example, an aircraft can follow the smoothened flight path to increase fuel efficiency while also remaining within parameters (e.g., maximum acceleration, velocity, altitude, etc.) of the aircraft.

Moreover, the approach described herein smooths the flight path in two directions. Namely, the approach herein smooths the flight path in a direction from the beginning of the flight path towards the end of the flight path, and from the end of the flight path towards the beginning of the flight path. Doing so enhances efficiency while generating the smoothened path.

Figure 1:
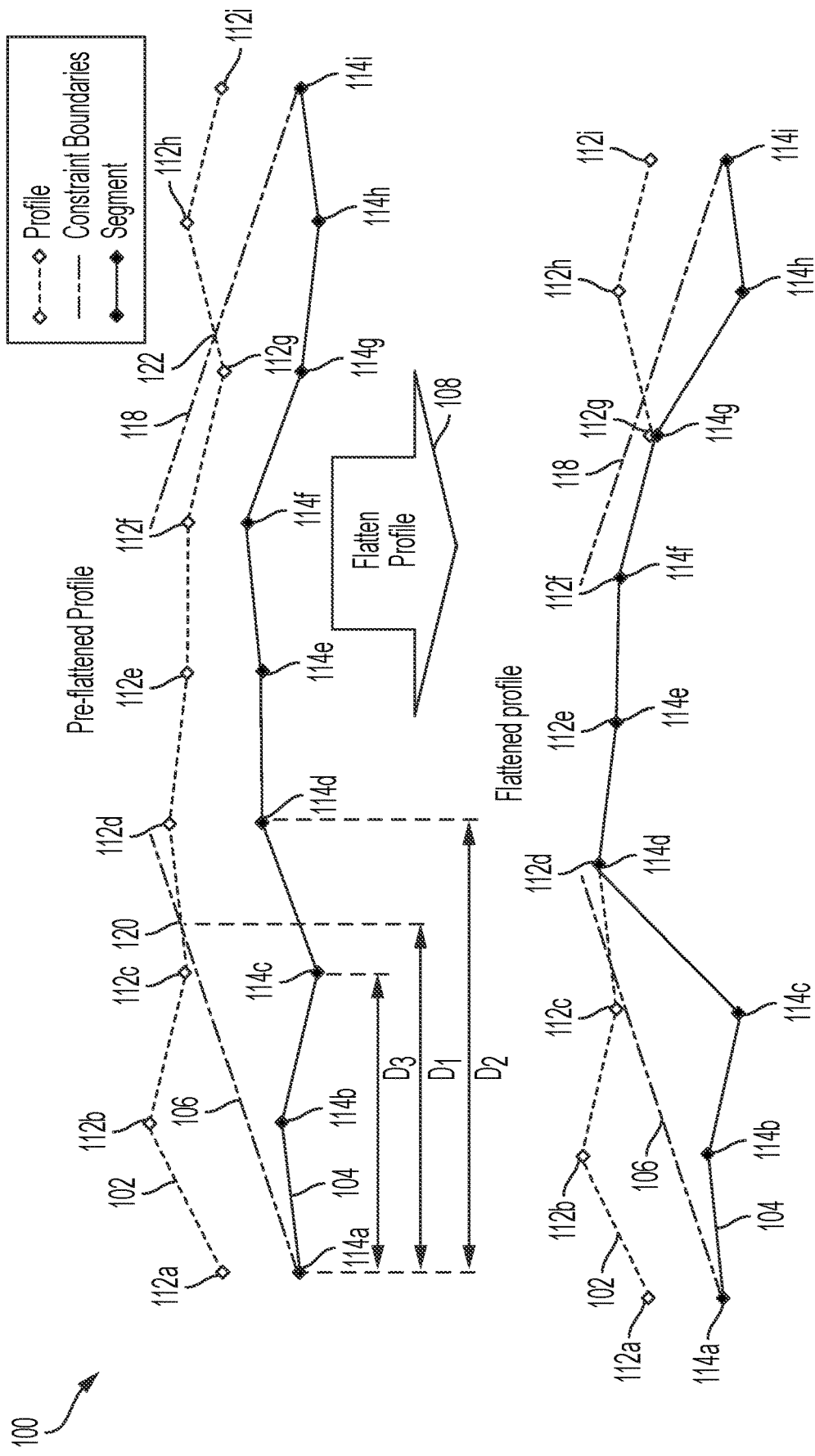
FIG. 1 is a process of an example of a pre-processing portion of a flight path generation and smoothing process according to an example.

FIGS. 1-9 illustrate various aspects of a flight path generation and smoothing process. The aspects below are equally applicable to both velocity and altitude. The flight path generation and smoothing process is divided into at least two aspects, namely flattening and smoothing. FIG. 1 illustrates a pre-processing portion 100 (e.g., flattening) of the flight path generation and smoothing process. That is, instead of beginning with an unsmoothed path that meets dynamic constraints (e.g., physical limitations of an aircraft), but does not track the desired profile, examples herein execute pre-processing to set a flight path to match the desired profile with the exception of the start and end points, and then smoothens the flight path back towards an original profile until the flight path satisfies the dynamic constraints supplied during planning. Thus, the start and end points remain unchanged during the pre-processing (are not analyzed for modification).

In the pre-flattened profile, a desired profile 102 (e.g., flight profile) and a flight path 104 are illustrated. The desired profile 102 and the flight path 104 illustrate values of a parameter (e.g., altitude, velocity, etc.) with respect to distance (e.g., the value of the parameter is measured in the vertical direction and distance is measured in the horizontal direction). Examples herein modify the flight path 104 such that the flight path 104 approaches the desired profile 102. The desired profile 102 can be provided by a user and includes desired values for parameters (e.g., altitude, velocity, etc.) at various points referred to as desired waypoints 112a-112i. The desired waypoints 112a-112i represent different locations along the desired profile 102.

The flight path 104 comprises a series of path waypoints 114a-114i. The path waypoints 114a-114i represent different locations and values for the parameters (e.g., altitude, velocity, etc.) at the locations of the path waypoints 114a-114i. The flight path 104 is modified such that the path waypoints 114a-114i (e.g., velocity and/or altitude) approach the desired waypoints 112a-112i (e.g., velocity and/or altitude). That is, examples herein modify the values of the path waypoints 114a-114i to approach (e.g., converge with, become identical to, approximate, etc.) the desired waypoints 112a-112i. Doing so facilitates expedient and efficient processing since the path waypoints 114a-114i can potentially be bypassed for future analysis and/or modification during more processing power intensive and costly path processing analysis described below with respect to FIGS. 2-9.

During the pre-processing portion 100, a minimum distance needed to reach the desired profile 102 from each of the beginning point and endpoint of the flight path 104 is calculated. The beginning point and endpoint in this example are a first path waypoint 114a and a ninth path waypoint 114i of the path waypoints 114a-114i.

As an example, suppose that the desired profile 102 and the flight path 104 reflect different values for altitude (i.e., the parameter is set to altitude). Beginning and end constraint boundaries 106, 118 (e.g., maximum changes in altitude of the aircraft, physical limitations of the aircraft etc.) reflect a maximum change in altitude of the aircraft. That is, a maximum path of ascent of the aircraft from the first path waypoint 114a is illustrated by the beginning constraint boundary 106. A maximum level of descent to the ninth path waypoint 114i is illustrated by the end constraint boundary 118.

On a first end, the beginning constraint boundary 106 intersects the first path waypoint 114a (e.g., a first altitude at a first distance $D_1$). At a second end, the beginning constraint boundary 106 (e.g., a maximum change in increase in altitude) intersects the desired profile 102 at a beginning intersection 120. The beginning intersection 120 indicates a nearest point on the desired profile 102 that the aircraft can intersect when navigating from the first path waypoint 114a. The fourth desired waypoint 112d from the desired waypoints 112a-112i is the nearest waypoint that is subsequent to the beginning intersection 120. Thus, the earliest desired waypoint from the desired waypoints 112a-112i that the aircraft can intersect with is the fourth desired waypoint 112d.

At a first end, the end constraint boundary 118 intersects a ninth path waypoint 114i (e.g., an altitude). At a second end, the end constraint boundary 118 (e.g., a maximum change in decreasing altitude) intersects with the desired profile 102 at an end intersection 122. The end intersection 122 is a last point on the desired profile 102 that the aircraft can navigate while also descending to the ninth path waypoint 114i. Thus, the seventh desired waypoint 112g is the last desired waypoint from the desired waypoints 112a-112i that the flight path 104 can intersect with while also descending to meet a value of the ninth path waypoint 114i.

The pre-processing portion 100 flattens the profile 108 based on the beginning and end intersections 120, 122 so that a subset of path waypoints from the path waypoints 114a-114i that occur between (e.g., as considered with respect to distance or the horizontal axis) the beginning and end intersections 120, 122 merge with a subset of the desired waypoints from the desired waypoints 112a-112i between (e.g., as considered with respect to distance or the horizontal axis) the beginning and end intersections 120, 122. Thus, the fourth-seventh path waypoints 114d-114g are adjusted to match the fourth-seventh desired waypoints 112d-112g as shown in the flattened profile.

As such, some examples calculate the first distance $D_1$ from the first path waypoint 114a, which is a beginning of the flight path 104, to reach the one or more of the desired velocities or the desired altitudes to comply with the beginning constraint boundary 106 (e.g., a constraint associated with the aircraft), and identify the fourth path waypoint 114d from the path waypoints 114a-114i based on the first distance $D_1$. Examples further adjust the fourth path waypoint 114d to reach the one or more of the desired velocities or the desired altitudes. In some examples, the fourth path waypoint 114*d* is determined to be adjusted based on the fourth path waypoint 114*d* being disposed at a second distance $D_2$ from the beginning of the flight path 104 and the second distance $D_2$ being equal to or greater than the first distance $D_1$. Some examples determine that one or more of first-third path waypoints 114*a*-114*c* are to be maintained based on a third distance $D_3$ between the one or more of first-third path waypoints 114*a*-114*c* and the beginning of the flight path 104, where the third distance $D_3$ is less than the first distance $D_1$.

As such, examples identify the flight path 104, where the flight path 104 includes a plurality of segments that each include at least one of the path waypoints 114*a*-114*i*. Examples further identify the desired profile 102 (e.g., a flight profile) that includes one or more of desired velocities or desired altitudes at the desired waypoints 112*a*-112*i*. Examples further calculate a first distance $D_1$ from a beginning of the flight path 104 to reach the one or more of the desired velocities or the desired altitudes to comply with the constraint associated with the aircraft, and identify the fourth path waypoint 114*d* from the path waypoints 114*a*-114*i* based on the first distance $D_1$. Examples further adjust the fourth path waypoint 114*d* to reach the one or more of the desired velocities or the desired altitudes. The fourth path waypoint 114*d* is disposed at the second distance $D_2$ from the beginning of the flight path 104, where the second distance $D_2$ is equal to or greater than the first distance $D_1$. Some examples determine that another waypoint (e.g., one or more of first-third path waypoints 114*a*-114*c*) of the path waypoints 114*a*-114*i* is to be maintained based on a third distance $D_3$ between the another waypoint and the beginning of the flight path 114, where the third distance $D_3$ is less than the first distance $D_1$. Some examples can adjust a third path waypoint of the path waypoints 114*a*-114*i* to violate the constraint.

The pre-processing portion 100 ensures that at least some of the path waypoints 114*a*-114*i* will ultimately end up reaching the desired profile 102. Thus, the fourth-seventh path waypoints 114*d*-114*g* can be bypassed for further smoothing, and the smoothing described below with at least some of FIGS. 2-9 will only have to act on the first-third path waypoints 114*a*-114*c* and the eight-ninth path waypoints 114*h*-114*i* that were not modified during the pre-processing portion 100, while also resolving the dynamic constraint violations introduced by the flattening step.

Thus, the pre-processing portion 100 is a first step of altitude smoothing and calculates the first distance $D_1$ to reach the desired profile 102 (e.g., an altitude profile) from the beginning of the flight path 104, and to descend from the desired profile 102 to the end of the flight path 104. Examples iterate along the flight path 104, starting at the start altitude (or velocity), and changing altitude (or velocity) at the maximum rate allowed by the dynamic constraints of the aircraft (or vehicle) as indicated by the beginning and end constraint boundaries 106, 118. Once the altitude passes the desired profile 102, that index (e.g., a waypoint) is stored as that is the first index to be set to the flight path 104. The process is then repeated from the end altitude of the flight path 104, iterating in reverse. After both indices are found, all indices (e.g., waypoints) between the indices found, inclusive, are adjusted to match the desired profile 102.

FIGS. 2-9 illustrate various smoothing processes that iterate along a flight path, such as flight path 104 (e.g., a terrain profile), checking where constraints are violated, and adding additional intermediate points when necessary to resolve constraint violations, and reach the desired profile in the minimum distance. For each iteration of the smoothing, a pass is performed in both forward (e.g., in a direction from a beginning of the flight path towards the end of the flight path) and backward (e.g., in a direction from the end of the flight path towards the beginning) along the route. While the smoothing processes functions for both paths made of waypoints or segments (where a segment defines a straight line or arc between two points), the examples below are shown using segments. The altitude and velocity smoothing are both implementations of the same smoothing processes, with the notable differences being the dimension (velocity or altitude) that the smoothing processes operate on, and that the velocity smoothing is a variation of the altitude smoothing. For example, some implementations smooth the velocity to a constant cruise speed instead of a varying the altitude profile.

FIGS. 2-9 shows various stages of the smoothing process. The smoothing process iterates through pairs of segments along the path, first forward, and then in reverse, adjusting segment altitudes and splitting segments as necessary to reach the desired altitude as quickly as dynamically feasible. With each pair, only the first of the two segments can be split into two, but the endpoint of the first segment, and the start of the second segment can be modified. The smoothing process will complete either after two full pairs of forward and reverse iterations has completed without any segments being modified, indicating the path has converged at a smoothed state, or when a configurable maximum number of iterations is reached.

Figure 2:
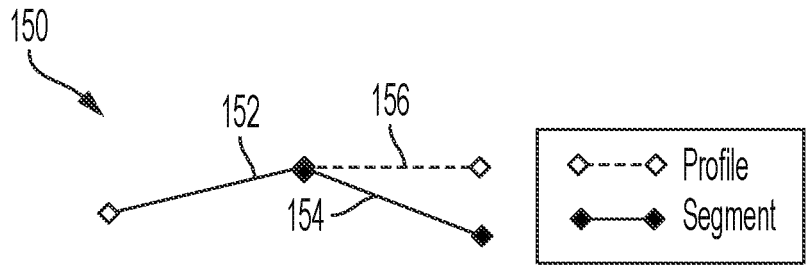
FIG. 2 is a process of an example of first and second cases for a segment modification bypass process according to an example.

FIG. 2 illustrates first and second cases for segment modification bypass process 150. For a pair of first and second segments 152, 154 of a flight path, the first and second segment modification bypass process 150 first checks if a segment can be bypassed for modification (e.g., skipped for altitude and/or velocity adjustments). An aircraft will implement the flight path to follow the flight path during flight. There are three situations in which segments can be bypassed for modification. The first and second segment modification bypass process 150 describes two of the situations. Furthermore, the first and second segment modification bypass process 150 first iterates along pairs of segments of the flight path in a forward direction from beginning of the flight path towards the end of the flight path, and then in a reverse direction from the end of the flight path towards the beginning of the flight path.

In the first case, a distance of the pair of first and second segments 152, 154 is compared to a threshold (e.g., very short). If the distance is below the threshold, the segment is bypassed for modifications since the segment is deemed to be inconsequential to the overall flight path. In some examples, the first case is limited to artifacts from the pre-processing portion 100, as both segments must be less than the threshold (e.g., 1 nm long).

The second case covers the segments being fully smoothed, which occurs when the desired profile 156 at least partially matches the flight path (e.g., terrain profile) comprising the first and second segments 152, 154, as depicted in FIG. 2. In this example, the first segment 152 matches the desired profile 156 such that the desired profile 156 is obscured behind the first segment 152. The second segment 154 does not need to be checked when the first segment 152 is checked in the second case, as the second segment 154 will be checked in the next iteration (e.g., if the present iteration is in a forward direction, the next iteration will be in the reverse order). That is, in the second case only one segment (e.g., the foremost segment according to the iteration direction) is analyzed. Thus, in the reverse direction the second segment 154 would be analyzed while the first segment 152 would be bypassed for analysis.

Figure 3:
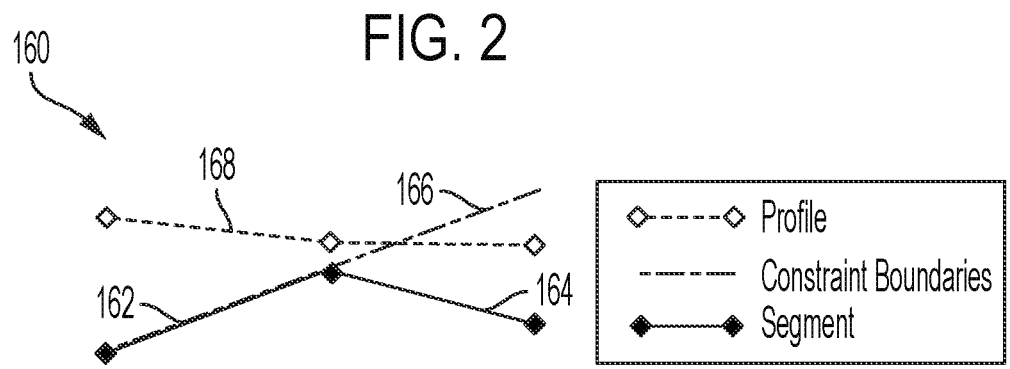
FIG. 3 is a process of an example of a third case for a segment modification bypass process according to an example.

FIG. 3 illustrates a third case for segment modification bypass process 160. A constraint boundary 166 is illustrated. A flight path comprising first and second segments 162, 164 is illustrated. An aircraft will implement the flight path to follow the flight path during flight. The constraint boundary 166 illustrates a maximum change in a parameter (e.g., velocity or altitude) that the aircraft can meet.

The third case occurs when a first segment 162 is already at the bounds of the constraint boundary 166 (e.g., climb angle constraints), but cannot not reach the desired value (e.g., altitude) of a desired profile 168, and therefore cannot be adjusted during this iteration. It is to be noted that later iterations can allow adjustment of first segment 162 as surrounding segments, such as second segment 164, are adjusted.

Figure 4:
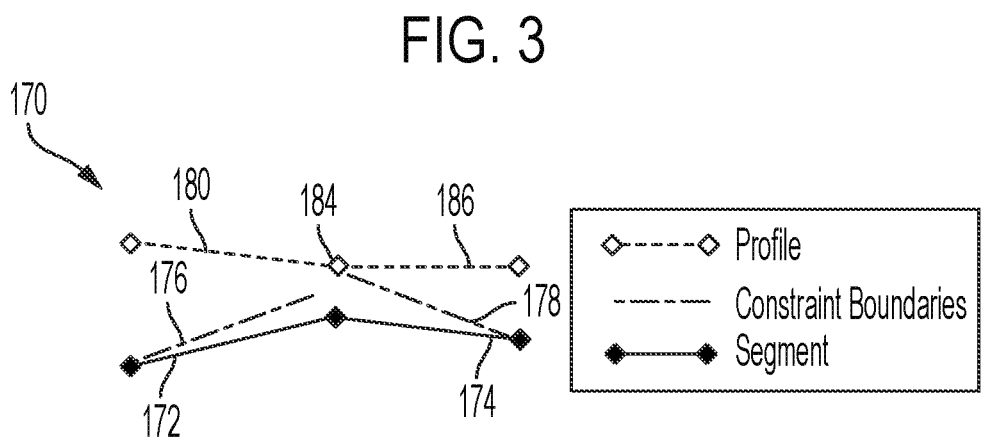
FIG. 4 is a process of an example of a first case of a waypoint violation process according to an example.

If neither of the above three cases occur as indicated in the first and second cases for first and second segment modification bypass process 150 and the third case for segment modification bypass process 160, then the smoothing process proceeds as illustrated in FIGS. 4-9. If segments are marked for being bypassed, then one or more of the examples of FIGS. 4-9 will not operate on the segments. Thus, the first and second segment modification bypass process 150 and the third case for segment modification bypass process 160 select a group of first and second segments 152, 154, 162, 164 of the plurality of segments. The first and second segment modification bypass process 150 and the third case for segment modification bypass process 160 determine whether the group of first and second segments 152, 154, 162, 164 are to be omitted for modification based on one or more of a length of the group of first and second segments 152, 154, 162, 164, one or more of the waypoints of the group of first and second segments 152, 154, 162, 164 meeting the one or more of the desired velocities or the desired altitudes, or an adjustment to the one or more of the waypoints to meet the one or more of the desired velocities or the desired altitudes results in a violation to the constraint FIG. 4 illustrates a first case for the waypoint violation process 170 which determines if constraints (e.g., a maximum change in a parameter of the aircraft) are allowed to be violated. A desired profile and a flight path comprising first and second flight segments 172, 174 are illustrated. An aircraft will implement the flight path to follow the flight path during flight. The first and second constraint boundaries 176, 178 illustrate a maximum change in a parameter (e.g., velocity or altitude) that the aircraft can meet. The desired profile includes first desired segment 180, second desired segment 186 and a desired waypoint 184.

There are two outcomes for the waypoint violation process 170: 1) the constraints are not violated; and 2) the constraints are permitted to be violated. The first case is a situation where neither the first flight segment 172 nor the second flight segment 174 violates climb angle constraints, as depicted in FIG. 4, to intersect desired waypoint 184. That is, to modify the first and second flight segments 172, 174 to intersect the desired waypoint 184, the slope of the first flight segment 172 would not exceed the first constraint boundary 176, and the slope of the second flight segment 174 would not be greater than the second constraint boundary 178. When this occurs, the smoothing process will proceed as normal to execute modifications to the first and second flight segments 172, 174. For example, the smoothing process can potentially split first flight segment 172 into two segments to allow the first portion of the first flight segment 172 to reach the desired profile (e.g., an altitude profile), and the second portion of the first flight segment 172 to track the desired profile.

Figure 5:
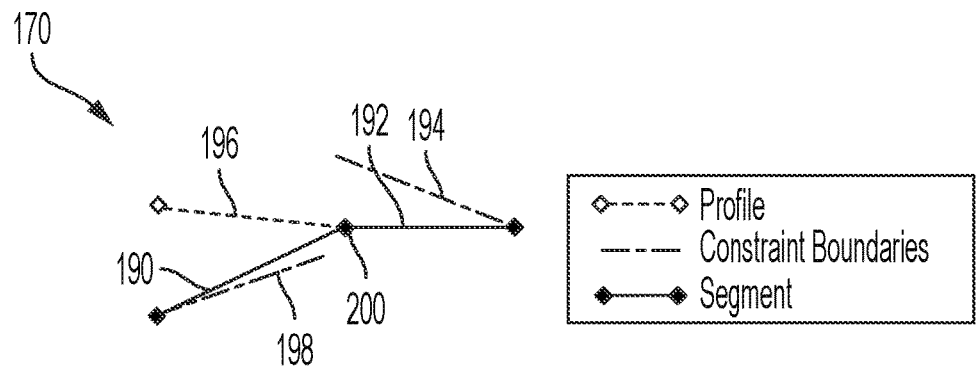
FIG. 5 is a process of an example of a second case of a waypoint violation process according to an example.

FIG. 5 shows the second case of the waypoint violation process 170 as applied to a flight path comprising first and second segments 190, 192 and a flight profile 196. As illustrated, a first segment 190 and waypoint 200 is permitted to violate the first constraint boundary 198. The first segment 190 can violate the first constraint boundary 198 as a result of the pre-processing portion 100 (FIG. 1). When this violation state occurs, some examples only focus on modifying the first segment 190 and a second segment 192 to achieve a state where the first segment 190 no longer violate constraints, and potentially permit the second segment 192 to potentially violate one or more of the first and second constraint boundaries 198, 194. Doing so prevents the smoothing process from getting stuck in a state where the smoothing process cannot make any change because the smoothing process could not cause one or both of the first and second segments 190, 192 to violate constraints. Instead, the smoothing process pushes the constraint violation problem toward the opposite end of the flight path, where the constraint violation will either resolve itself when a segment is able to reach the desired profile (e.g., an altitude profile), or when repeated forward and reverse iterations of the smoothing process converge to the flight path reaching the closest dynamically feasible values to the desired profile, if it is impossible to reach the desired profile altitude at any point.

Thus, the waypoint violation process 170 selects a group of the first and second segments 190, 192, of a plurality of segments. The waypoint violation process 170 determines whether one or more of the segments of the group of first and second segments 190, 192 violate the constraint. The waypoint violation process 170 adjusts the one or more segments and/or waypoints of the one or more segments in response to the one or more waypoints violating the constraint.

Figure 6:
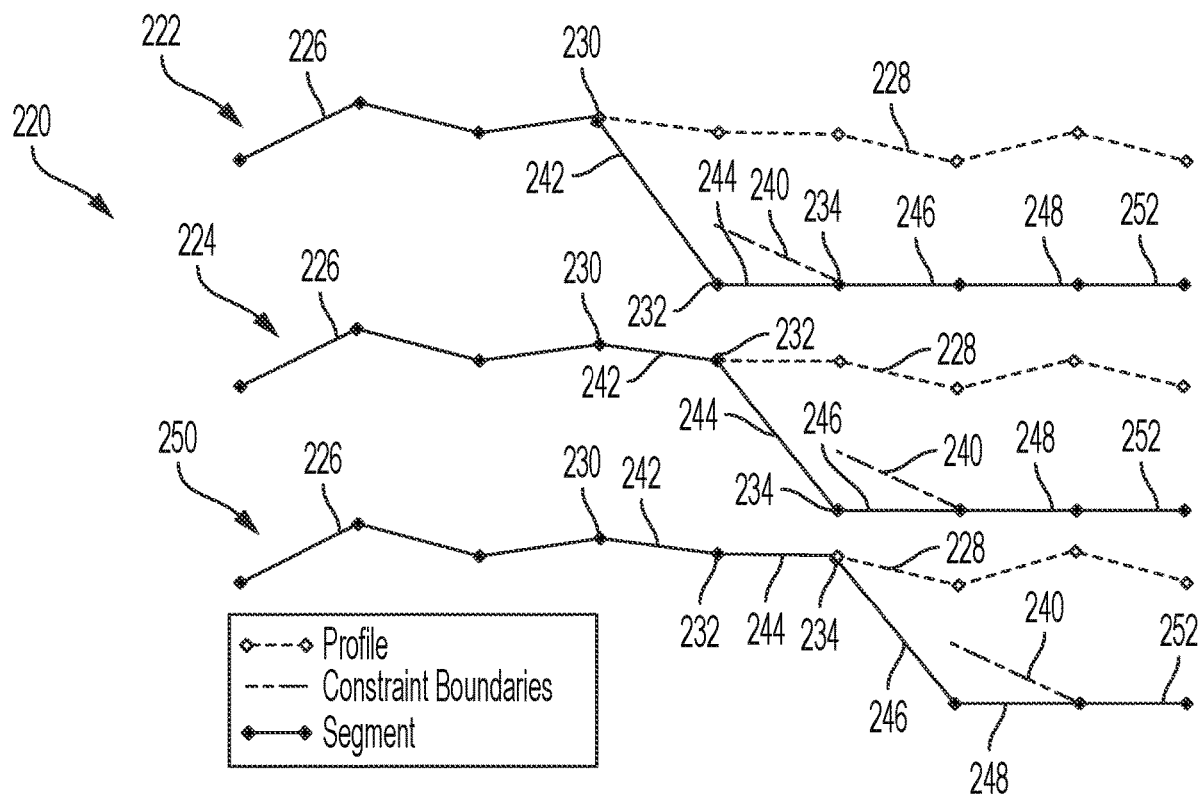
FIG. 6 is a process of an example of a smoothing progression according to an example.

A smoothing progression 220 is depicted in FIG. 6. The smoothing progression 220 incorporates the first and second case of the waypoint violation process 170 (FIGS. 4 and 5). As illustrated, at first progression 222 (e.g., a first iteration), a flight path 226 partially matches a desired profile 228 until a fourth path waypoint 230. A fourth segment 242 connecting the fourth path waypoint 230 and the fifth path waypoint 232 violates the constraint boundary 240 in order to meet the desired profile 228. That is the magnitude of the slope of the fourth segment 242 is greater than a magnitude of the slope of the constraint boundary 240. As discussed above, such violations are at least temporarily permitted to avoid becoming stuck.

In the second progression 224 (e.g., a second iteration), the fourth segment 242 is modified so that the fifth path waypoint 232 overlaps the desired profile 228. The fourth segment 242 no longer violates the constraint boundary 240. The fifth segment 244 then violates the constraint boundary 240.

In the third progression 250 (e.g., a third iteration), the fifth segment 244 is modified so that the sixth path waypoint 234 overlaps the desired profile 228. The fifth segment 244 no longer violates the constraint boundary 240. The sixth segment 246 then violates the constraint boundary 240. While not illustrated for brevity, the process can continue until the sixth segment 246, seventh segment 248 and eighth segment 252 overlap the desired profile 228 and do not violate the constraint boundary 240. Thus, by permitting temporary violations of the constraint boundary 240, an optimal solution is achieved in which the constraint boundary 240 is no longer violated. In some examples, the smoothing progression 220 can operate in a forward direction and in a reverse direction.

Figure 7:
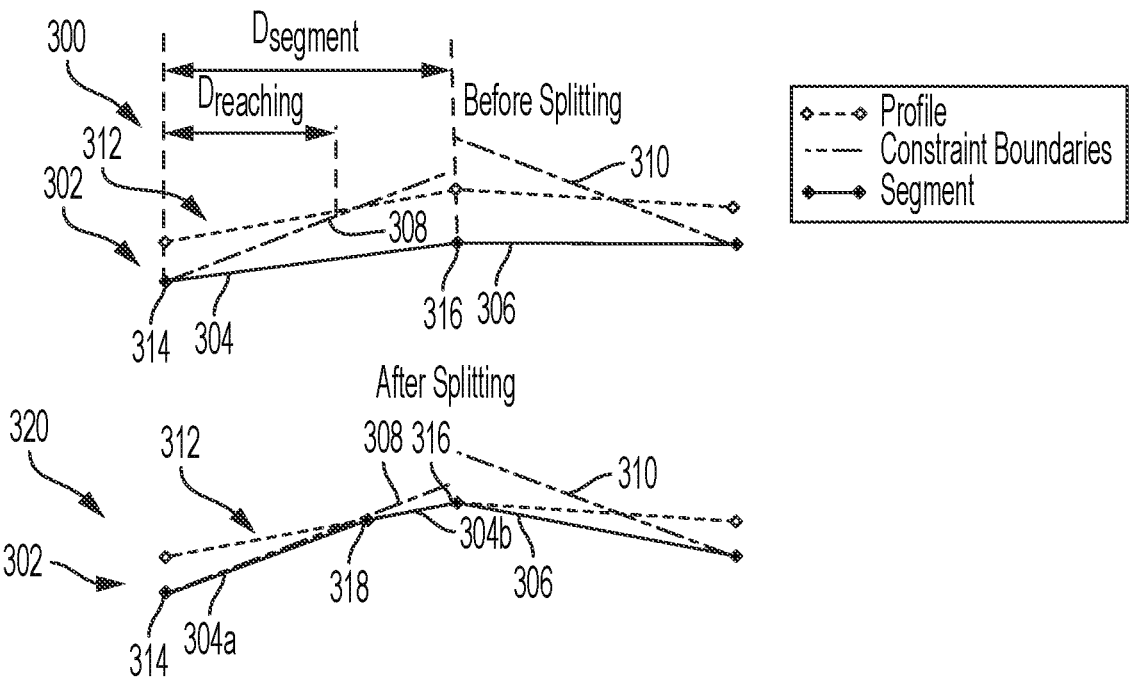
FIG. 7 is a process of an example of a first splitting process according to an example.

FIG. 7 illustrates a first splitting process 300. For example, when both first and second segments 304, 306 are dynamically feasible based on the and second constraint boundaries 308, 310, examples then enter optimization stages where a smoothened flight path 302 is enhanced to reach a desired profile 312 in the shortest distance via splitting segments.

The first case is the simplest and occurs when both first and second segments 304, 306 can reach the desired profile 312, and the first segment 304 can reach the desired profile 312 in a shorter distance than a length of the first segment 304. That is, a total length of the first segment 304 is not needed to reach the desired profile 312. Rather, the desired profile 312 can be reached in a shorter distance.

In this case, the first segment 304 should be split at the minimum horizontal distance to reach the desired profile 312 (e.g., an altitude profile) in as short a distance as possible. That is as shown at the modified graph 320, the first segment 304 is split into a first portion 304a and a second portion 304b (which can be considered different segments). The second portion 304b tracks the desired profile 312. The first portion 304a tracks the first constraint boundary 308 to reach the desired profile 312 in as short as distance as possible. The start altitude of the second segment 306 is adjusted to match the profile value (e.g., altitude) at the end of the second portion 304b.

Thus the first splitting process 300 selects a group of first and second segments 304, 306 of a plurality of segments and determines a reaching distance $D_{reaching}$ (e.g., a second distance) to reach the one or more of desired velocities or desired altitudes from an initial waypoint 314 (e.g., a beginning) of the group of segments. The first splitting process 300 determines a segment distance $D_{segment}$ (e.g., a third distance) between the initial waypoint 314 and a middle waypoint 316, where the middle waypoint 316 is part of the group of segments. The first splitting process 300 adds a new waypoint 318 to the first and second segments 304, 306 based on the segment distance $D_{segment}$ being greater than the reaching distance $D_{reaching}$. The first splitting process 300 sets the new waypoint 318 as the one or more of the desired velocities or the desired altitudes.

Figure 8:
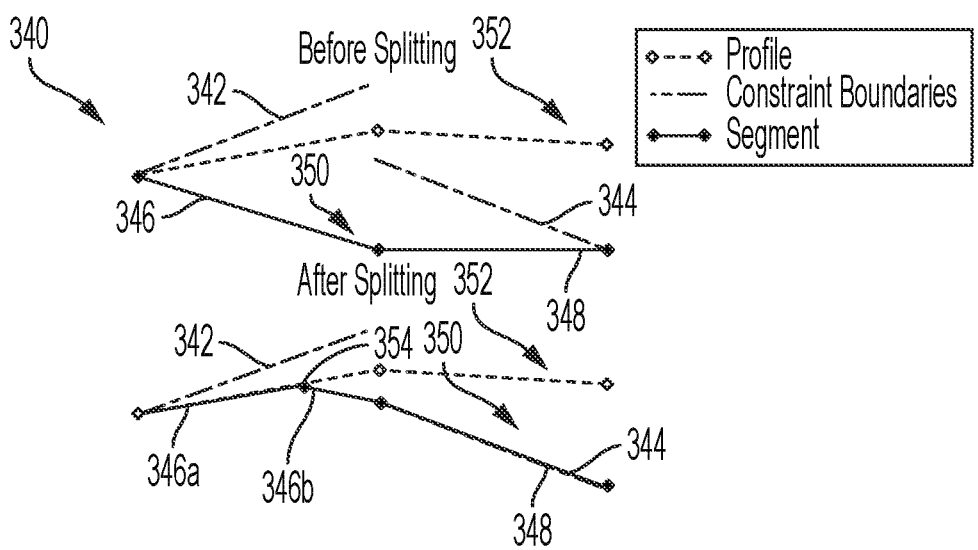
FIG. 8 is a process of an example of a second splitting process according to an example.

FIG. 8 illustrates a second splitting process 340. A flight profile 350 includes first and second segments 346, 348 comprising a flight path. The second splitting process 340 occurs when a start of the first segment 346 is already at a desired profile 352, and the constraint boundaries 342, 344 allow the first segment 346 to track the desired profile 352, but the constraint boundaries 342, 344 do not allow the start of the second segment 348 to reach the desired profile 352. That is, if the first segment 346 was adjusted to match the desired profile 352, the second segment 348 would not be able to reach the desired value (e.g., altitude) of the waypoint at the end of the second segment 348 without violating the constraint boundary 344.

In such a case, the slope of the second segment 348 at the bounds of the constraint boundary 344 is projected along the constraint boundary 344 until the projection of the second segment 348 intersects with the desired profile 352. In some examples, the projection can be the constraint boundary 344 where the constraint boundary 344 intersects the endpoint of the second segment 348. An intersection point between the projection and the desired profile 352 is determined.

The first segment 346 is then modified to follow the desired profile 352, and is then split into first and second portions 346a, 346b at the intersection point described above. The second portion 346b then is modified to link to the second segment 348. Thus, the first portion 346a tracks the desired profile 352, and the second portion 346b bridges the gap between the first portion 346a and the second segment 348.

Thus, the second splitting process 340 selects first and second segments 346, 348 of a plurality of segments. The second splitting process 340 determines that one or more segments of the group of first and second segments 346, 348 cannot meet the desired profile 352 without violating the constraint boundaries 342, 344. The second splitting process 340 adds a new waypoint 354 to the group of first and second segments 346, 348 based on the group of segments not meeting the flight profile without violating the constraint and set the new waypoint 354 to comply with the constraint.

Figure 9:
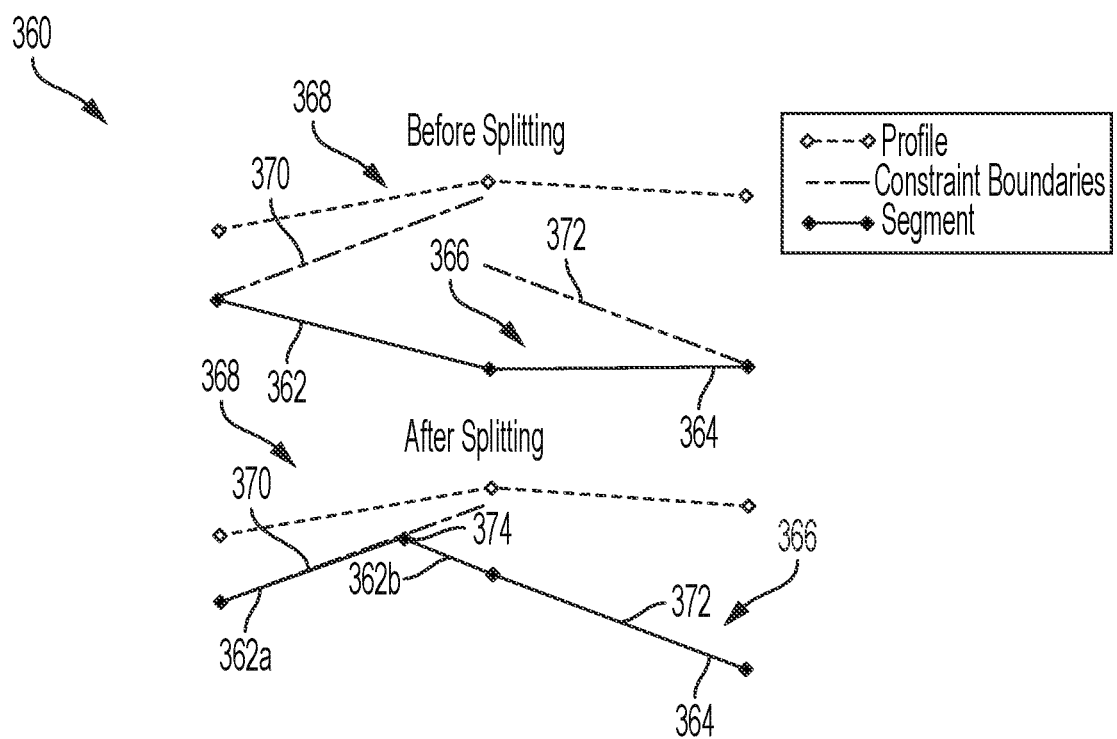
FIG. 9 is a process of an example of a third splitting process according to an example.

FIG. 9 illustrates a third splitting process 360 in which neither first or second segment 362, 364 of a flight path 366 can reach desired profile 368, and the first segment 362 can get closer to the desired profile 368 than the second segment 364 is able to get to the desired profile 368. The third splitting process 360 is similar to the second splitting process 340, with the exception being that the third splitting process 360 need not determine an intersection of the desired profile 368 and a projection of the second segment 364 based on the dynamic constraint 370, and/or the dynamic constraint 372. Rather, the third splitting process 360 determines an intersection between the first and second segments 362, 364 at the bounds of the dynamic constraints 370, 372 that bring the first and second segments 362, 364 closest to the desired profile.

Thus, the first segment 362 is projected along the dynamic constraint 370, and the second segment 364 is projected along the dynamic constraint 372. An intersection 374 between the projections is determined. The first segment 362 is split at the intersection 374 into a first portion 362a and a second portion 362b. The second portion 362b is modified to connect directly to the second segment 364. The first portion 362a is aligned with the dynamic constraint 370 and the second segment 364 is aligned with the dynamic constraint 372, with the second portion 362b connecting the first portion 362a and the second segment 364.

In some examples, the third splitting process 360 can introduce extra segments that are not necessary after another smoothing iteration or two. As such, the third splitting process 360 can be disabled until one iteration forward and one iteration backward has been executed without any change to the flight path, indicating that the flight path will not be able to reach the desired profile. Enabling the third splitting process 360 will allow the flight path to approach (but not meet) the desired profile at the center of the desired path. The first and second splitting processes 300, 340 execute during the one iteration forward and the one iteration backward.

Each of the first, second, and third splitting processes 300, 340, 360 has an opposite case, where the conditions for the respective first segments 304, 346, 362, and second segments 306, 348, 364 are reversed. Instead of implementing a further three cases, the opposite cases are instead handled in the reverse iteration along the path, where the second segments 306, 348, 364 are considered for splitting, with the first segments 304, 346, 362 being modified to connect to the split segments. If any splitting has occurred, the new segments is inserted accordingly with the modified segments. The first, second, and third splitting processes 300, 340, 360 then moves on to the next pair of segments in the route (e.g., newly created segments or the next segment in the flight path). Once the end of the flight path is reached, the first, second, and third splitting processes 300, 340, 360 is repeated starting at the second segments 306, 348, 364, and iterating forward. After a forward-reverse pair completes, the whole cycle repeats, until either two forward-reverse iterations occur without any changes occurring (allowing a chance for the third splitting case to take effect), or the maximum number of iterations is reached.

The velocity flattening and smoothing utilizes the same algorithm as altitude smoothing. The only differences are the substitution of climb/descent angle constraints for acceleration/deceleration constraints in all examples described herein.

Figure 10:
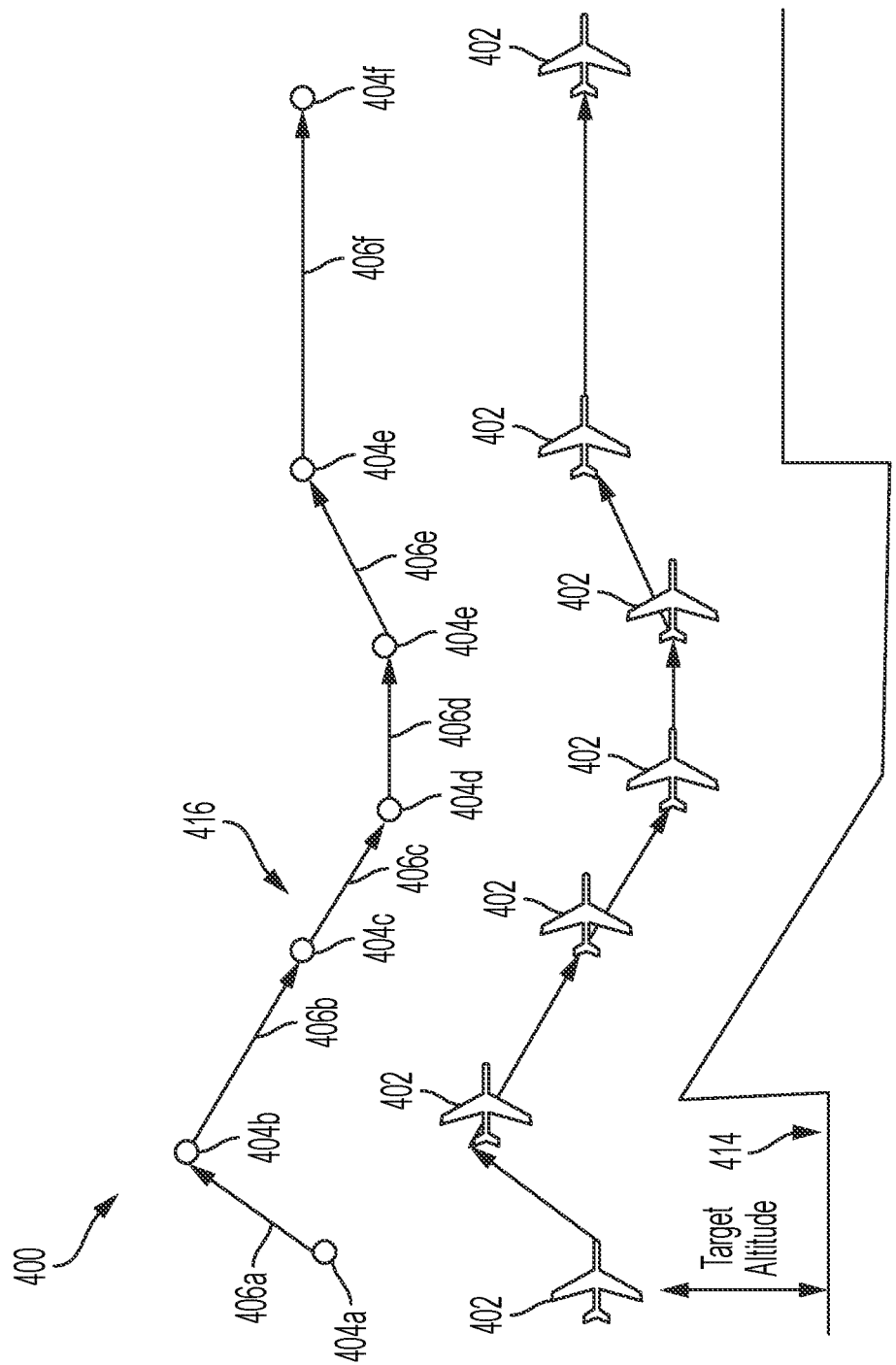
FIG. 10 is a process of an example of a flight generation and implementation process according to an example.

Turning now to FIG. 10, a flight generation and implementation process 400 is illustrated. In implementation process 400, a flight path 416 is a terrain-following altitude profile that provides an altitude profile for aircraft 402 along a series of waypoints that roughly follows an underlying terrain 414 while smoothing velocity and/or altitude adjustments through a selection of waypoints along the flight path 416 and the processes described herein. Previously, the flight path 416 was modified based on the above processes to approach, if not reach, a desired profile. The flight path 416 includes a series of waypoints 404a-404f and segments 406a-406f. The aircraft 402 follows the flight path 416 to maintain an altitude (or velocity).

Figure 11:
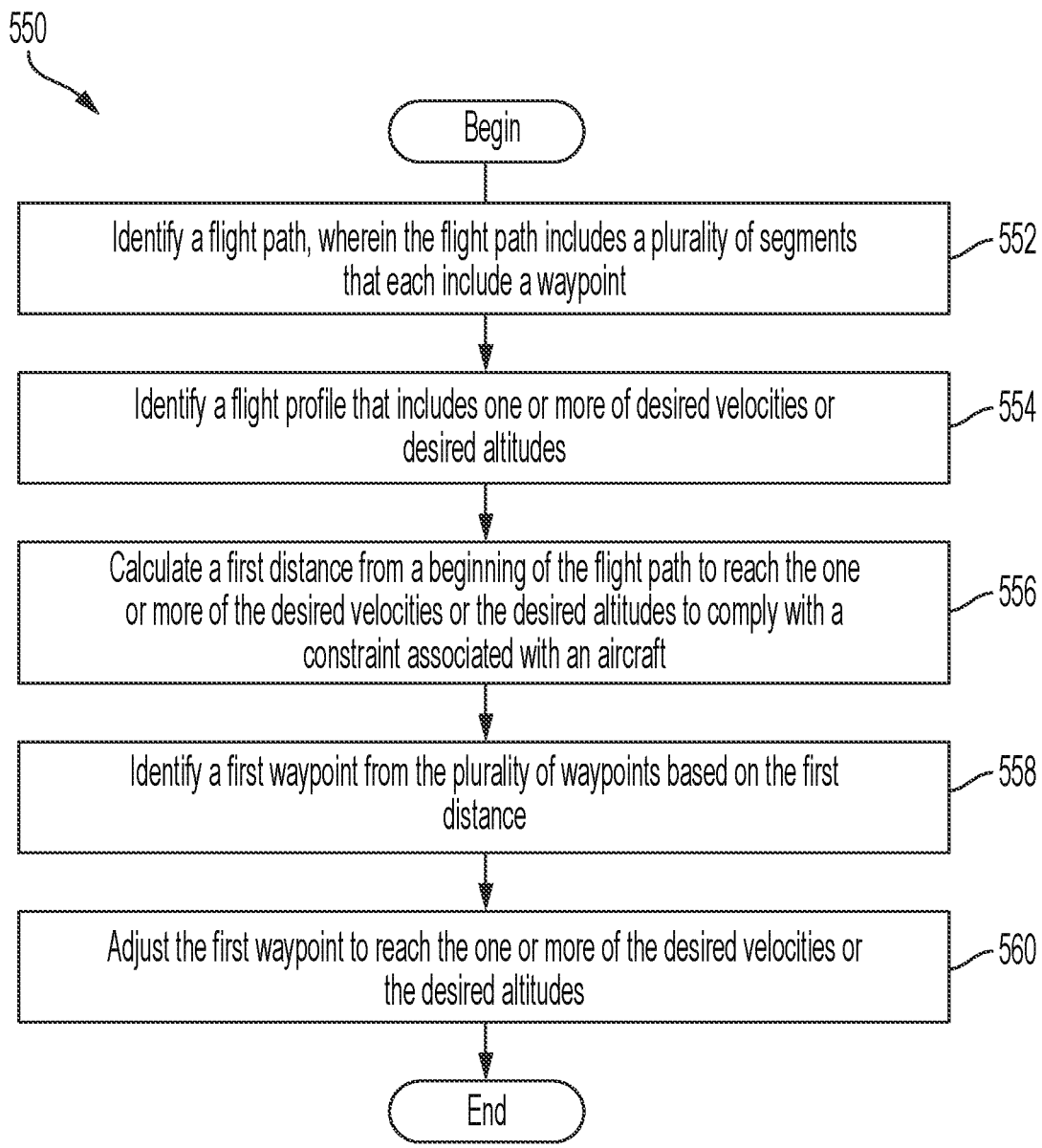
FIG. 11 is a flowchart of an example of a method of generating a flight path for an autonomous and/or semi-autonomous aircraft according to an example.

FIG. 11 illustrates a method 550 of generating a flight path for an autonomous and/or semi-autonomous aircraft. Method 550 can be generated prior to the aircraft following the flight path. The method 550 is generally implemented as part of pre-processing portion 100 (FIG. 1) already discussed. In an example, the method 550 is implemented in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. When implemented, the method 550 enables a computer system with a processor and memory to operate as a special purpose computer system for generation of a pre-processing and smoothening a flight path. For example, the method 550 can be executed with a processor, and a memory coupled to the processor, the memory including a set of instructions, which when executed by the processor, causes the system to implement method 550.

Illustrated processing block 552 identifies a flight path, where the flight path includes a plurality of segments that each include a waypoint. Illustrated processing block 554 identifies a flight profile that includes one or more of desired velocities or desired altitudes. Illustrated processing block 556 calculates a first distance from a beginning of the flight path to reach the one or more of the desired velocities or the desired altitudes to comply with a constraint associated with an aircraft. Illustrated processing block 558 identifies a first waypoint from the plurality of waypoints based on the first distance. Illustrated processing block 560 adjusts the first waypoint to reach the one or more of the desired velocities or the desired altitudes.

In some examples, the first waypoint is disposed at a second distance from the beginning of the flight path, where the second distance is equal to or greater than the first distance. In such examples, the method 550 determines that a second waypoint of the plurality of waypoints is to be maintained based on a third distance between the second waypoint and the beginning of the flight path, where the third distance is less than the first distance. Method 550 adjusts a third waypoint of the plurality of waypoints to violate the constraint.

In some examples, the method 550 selects a group of segments of the plurality of segments, and determines whether the group of segments are to be omitted for modification based on one or more of a length of the group of segments, one or more of the waypoints of the group of segments meeting the one or more of the desired velocities or the desired altitudes, or an adjustment to the one or more of the waypoints to meet the one or more of the desired velocities or the desired altitudes results in a violation to the constraint. In some example, the method 550 selects a group of segments of the plurality of segments, determines whether one or more of the segments of the group of segments violates the constraint and adjusts the one or more segments in response to the one or more segments violating the constraint. In some examples, the method 550 selects a group of segments of the plurality of segments, determines a second distance to reach the one or more of the desired velocities or the desired altitudes from a second waypoint of the plurality of waypoints, where the second waypoint is part of the group of segments, determines a third distance between the second waypoint and a third waypoint of the waypoints, where the third waypoint is part of the group of segments, adds a new waypoint to the group of segments based on the third distance being greater than the second distance and sets the new waypoint as the one or more of the desired velocities or the desired altitudes.

In some examples, method 550 selects a group of segments of the plurality of segments, determines that the waypoints of the group of segments cannot meet the flight profile without violating the constraint, adds a new waypoint to the group of segments based on the group of segments not meeting the flight profile without violating the constraint and sets the new waypoint to comply with the constraint. In some examples, the method 550 iterates from a beginning of the flight path to an end of the flight path to adjust the plurality of waypoints, and iterates from the end of the flight path to the beginning of the flight path to adjust the plurality of waypoints.

Figure 12:
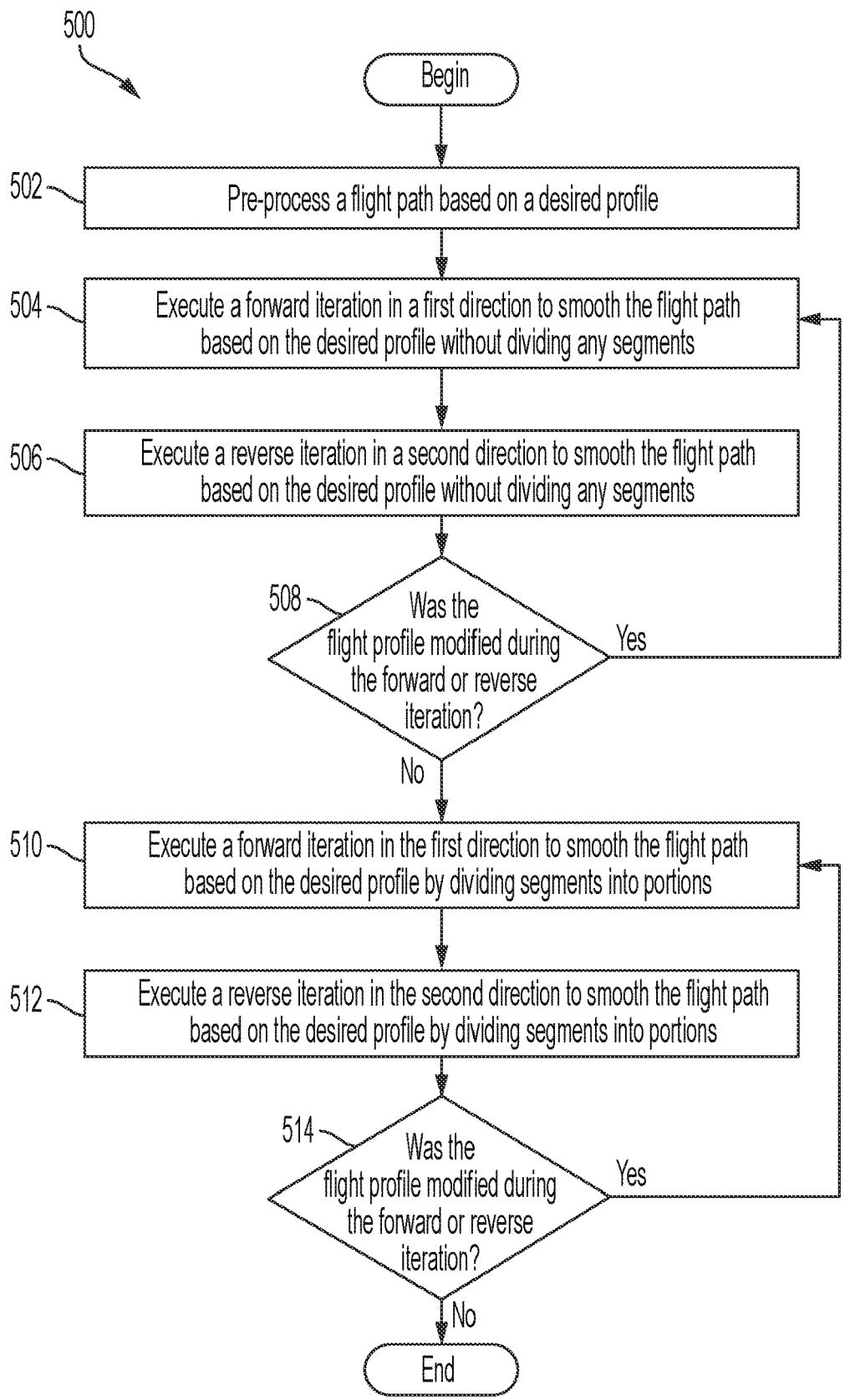
FIG. 12 is a flowchart of an example of a method of iteratively adjusting a flight path according to an example.

FIG. 12 illustrates a method 500 of iteratively adjusting a flight path. In an example, the method 500 is implemented in one or more modules as a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 502 pre-processes a flight path based on a desired profile. In some examples, processing block 502 includes aspects described with respect to pre-processing portion 100 (FIG. 1). Illustrated processing block 504 executes a forward iteration in a first direction (e.g., from a beginning of the flight path to an end of the flight path) to smooth the flight path based on the desired profile without dividing any segments. In some examples, processing block 504 includes aspects described with respect to the first and second segment modification bypass process 150 (FIG. 2), the third case for segment modification bypass process 160 (FIG. 3), first and second cases of the waypoint violation process 170 (FIGS. 4 and 5) and smoothing progression 220 (FIG. 6). For example, processing block 504 can modify the flight path to approach if not intersect with the desired profile. Illustrated processing block 506 executes a reverse iteration in a second direction (e.g., in a direction from an end of the flight path to the beginning of the flight path) to smooth the flight path based on the desired profile without dividing any segments. For example, processing block 506 can modify the flight path to approach if not intersect with the desired profile. In some examples, processing block 506 includes aspects described with respect to the first and second segment modification bypass process 150 (FIG. 2), the third case for segment modification bypass process 160 (FIG. 3), first and second cases of the waypoint violation process 170 (FIGS. 4 and 5) and smoothing progression 220 (FIG. 6).

Illustrated processing block 508 determines if the flight profile was modified during the forward or reverse iteration. If so, processing block 504 executes. Otherwise, illustrated processing block 510 executes a forward iteration in the first direction to smooth the flight path based on the desired profile by dividing segments into portions (e.g., creates new segments). In some examples, processing block 510 includes aspects described with respect to first splitting process 300 (FIG. 7), second splitting process 340 (FIG. 8) and third splitting process 360 (FIG. 9). Illustrated processing block 512 executes a reverse iteration in the second direction to smooth the flight path based on the desired profile by dividing segments into portions (e.g., creates new segments). In some examples, processing block 512 includes aspects described with respect to first splitting process 300 (FIG. 7), second splitting process 340 (FIG. 8), and third splitting process 360 (FIG. 9). Illustrated processing block 514 determines if the flight profile was modified during the forward or reverse iteration in processing blocks 510, 512. If so, processing block 510 executes. Otherwise the method 500 ends. An aircraft can execute the flight profile as modified by the method 500.

Figure 13:
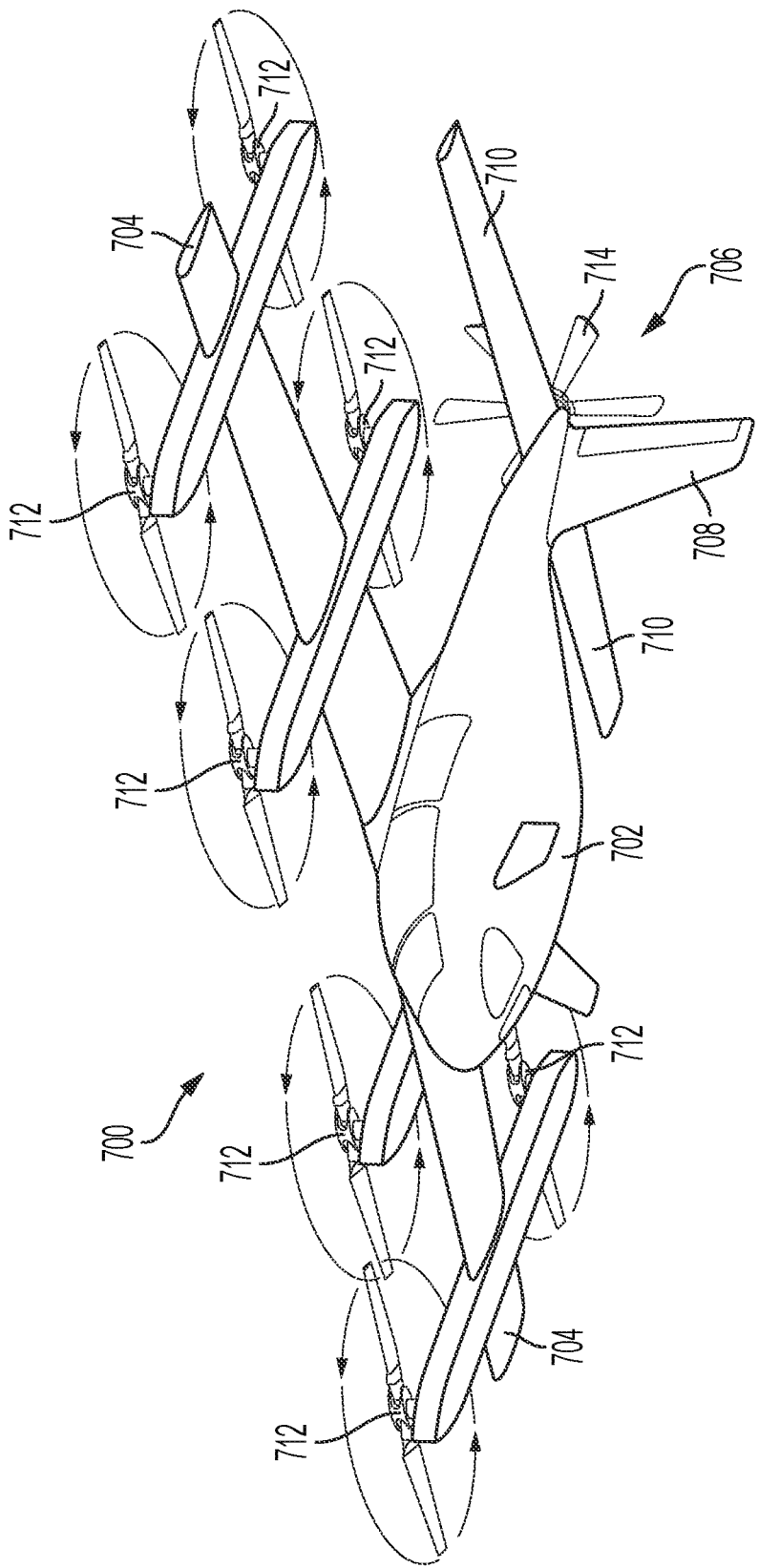
FIG. 13 is a block diagram of an example of a robot according to an example.

FIG. 13 illustrates one type of robot, namely, an Unmanned Aerial Vehicle (UAV) 700 (e.g., a type of aircraft), that can benefit from example implementations of the present disclosure. As shown, the UAV 700 generally includes a fuselage 702, wings 704 extending from opposing sides of the UAV 700 in a mid-section of the fuselage 702, and an empennage or tail assembly 706 at a rear end of the fuselage 702. The tail assembly 706 includes a vertical stabilizer 708 and two horizontal stabilizers 710 extending from opposing sides of the UAV 700. Rotors 712 and 714 are mounted to respectively the wings and the end of the tail assembly 706 for lifting and propelling the UAV 700 during flight.

Further, the disclosure comprises additional examples as detailed in the following clauses below.

Clause 1. A system comprising:
a processor; and
a memory coupled to the processor, the memory including a set of instructions, which when executed by the processor, causes the system to:
identify a flight path, wherein the flight path includes a plurality of segments that each include a waypoint;
identify a flight profile that includes one or more of desired velocities or desired altitudes;
calculate a first distance from a beginning of the flight path to reach the one or more of the desired velocities or the desired altitudes to comply with a constraint associated with an aircraft;
identify a first waypoint from the plurality of waypoints based on the first distance; and
adjust the first waypoint to reach the one or more of the desired velocities or the desired altitudes.

Clause 2. The system of clause 1, wherein the first waypoint is disposed at a second distance from the beginning of the flight path, wherein the second distance is equal to or greater than the first distance,
wherein the instructions, when executed, cause the system to:
determine that a second waypoint of the plurality of waypoints is to be maintained based on a third distance between the second waypoint and the beginning of the flight path, wherein the third distance is less than the first distance; and
adjust a third waypoint of the plurality of waypoints to violate the constraint.

Clause 3. The system of clause 1 or 2, wherein the instructions, when executed, cause the system to:
select a group of segments of the plurality of segments; and
determine whether the group of segments are to be omitted for modification based on one or more of a length of the group of segments, one or more of the waypoints of the group of segments meeting the one or more of the desired velocities or the desired altitudes, or an adjustment to the one or more of the waypoints to meet the one or more of the desired velocities or the desired altitudes results in a violation to the constraint.

Clause 4. The system of clause 1, wherein the instructions, when executed, cause the system to:
select a group of segments of the plurality of segments;
determine whether one or more of the segments of the group of segments violate the constraint; and
adjust the one or more segments in response to the one or more segments violating the constraint.

Clause 5. The system of clause 1, wherein the instructions, when executed, cause the system to:
select a group of segments of the plurality of segments;
determine a second distance to reach the one or more of the desired velocities or the desired altitudes from a second waypoint of the plurality of waypoints, wherein the second waypoint is part of the group of segments;
determine a third distance between the second waypoint and a third waypoint of the plurality of waypoints, wherein the third waypoint is part of the group of segments;
add a new waypoint to the group of segments based on the third distance being greater than the second distance; and
set the new waypoint as the one or more of the desired velocities or the desired altitudes.

Clause 6. The system of clause 1, wherein the instructions, when executed, cause the system to:
select a group of segments of the plurality of segments;
determine that one or more segments of the group of segments cannot meet the flight profile without violating the constraint;
add a new waypoint to the group of segments based on the group of segments not meeting the flight profile without violating the constraint; and
set the new waypoint to comply with the constraint.

Clause 7. The system of any one of clauses 1-6, wherein the instructions, when executed, cause the system to:
iterate from a beginning of the flight path to an end of the flight path to adjust the plurality of waypoints; and iterate from the end of the flight path to the beginning of the flight path to adjust the plurality of waypoints.

Clause 8. At least one computer readable storage medium comprising a set of instructions, which when executed by a computing device, cause the computing device to:
identify a flight path, wherein the flight path includes a plurality of segments that each include a waypoint;
identify a flight profile that includes one or more of desired velocities or desired altitudes;
calculate a first distance from a beginning of the flight path to reach the one or more of the desired velocities or the desired altitudes to comply with a constraint associated with an aircraft;
identify a first waypoint from the plurality of waypoints based on the first distance; and
adjust the first waypoint to reach the one or more of the desired velocities or the desired altitudes.

Clause 9. The at least one computer readable storage medium of clause 8, wherein the first waypoint is disposed at a second distance from the beginning of the flight path, wherein the second distance is equal to or greater than the first distance,
wherein the instructions, when executed, cause the computing device to:
determine that a second waypoint of the plurality of waypoints is to be maintained based on a third distance between the second waypoint and the beginning of the flight path, wherein the third distance is less than the first distance; and
adjust a third waypoint of the plurality of waypoints to violate the constraint.

Clause 10. The at least one computer readable storage medium of clause 8 or 9, wherein the instructions, when executed, cause the computing device to:
select a group of segments of the plurality of segments; and
determine whether the group of segments are to be omitted for modification based on one or more of a length of the group of segments, one or more of the waypoints of the group of segments meeting the one or more of the desired velocities or the desired altitudes, or an adjustment to the one or more of the waypoints to meet the one or more of the desired velocities or the desired altitudes results in a violation to the constraint.

Clause 11. The at least one computer readable storage medium of clause 8, wherein the instructions, when executed, cause the computing device to:
select a group of segments of the plurality of segments;
determine whether one or more of the segments of the group of segments violate the constraint; and
adjust the one or more segments in response to the one or more segments violating the constraint.

Clause 12. The at least one computer readable storage medium of clause 8, wherein the instructions, when executed, cause the computing device to:
select a group of segments of the plurality of segments;
determine a second distance to reach the one or more of the desired velocities or the desired altitudes from a second waypoint of the plurality of waypoints, wherein the second waypoint is part of the group of segments;
determine a third distance between the second waypoint and a third waypoint of the plurality of waypoints, wherein the third waypoint is part of the group of segments;
add a new waypoint to the group of segments based on the third distance being greater than the second distance; and
set the new waypoint as the one or more of the desired velocities or the desired altitudes.

Clause 13. The at least one computer readable storage medium of clause 8, wherein the instructions, when executed, cause the computing device to:
select a group of segments of the plurality of segments;
determine that the waypoints of the group of segments cannot meet the flight profile without violating the constraint;
add a new waypoint to the group of segments based on the group of segments not meeting the flight profile without violating the constraint; and
set the new waypoint to comply with the constraint.

Clause 14. The at least one computer readable storage medium of any one of clauses 8-13, wherein the instructions, when executed, cause the computing device to:
iterate from a beginning of the flight path to an end of the flight path to adjust the plurality of waypoints; and
iterate from the end of the flight path to the beginning of the flight path to adjust the plurality of waypoints.

Clause 15. A method for controlling at least one aircraft comprising:
identifying a flight path, wherein the flight path includes a plurality of segments that each include a waypoint;
identifying a flight profile that includes one or more of desired velocities or desired altitudes;
calculating a first distance from a beginning of the flight path to reach the one or more of the desired velocities or the desired altitudes to comply with a constraint associated with an aircraft;
identifying a first waypoint from the plurality of waypoints based on the first distance; and
adjusting the first waypoint to reach the one or more of the desired velocities or the desired altitudes.

Clause 16. The method of clause 15, wherein the first waypoint is disposed at a second distance from the beginning of the flight path, wherein the second distance is equal to or greater than the first distance,
the method further comprising:
determining that a second waypoint of the plurality of waypoints is to be maintained based on a third distance between the second waypoint and the beginning of the flight path, wherein the third distance is less than the first distance; and
adjusting a third waypoint of the plurality of waypoints to violate the constraint.

Clause 17. The method of clauses 15 or 16 further comprising:
selecting a group of segments of the plurality of segments; and
determining whether the group of segments are to be omitted for modification based on one or more of a length of the group of segments, one or more of the waypoints of the group of segments meeting the one or more of the desired velocities or the desired altitudes, or an adjustment to the one or more of the waypoints to meet the one or more of the desired velocities or the desired altitudes results in a violation to the constraint.

Clause 18. The method of clause 15 further comprising:
selecting a group of segments of the plurality of segments;
determining whether one or more of the segments of the group of segments violate the constraint; and
adjusting the one or more segments in response to the one or more segments violating the constraint.

Clause 19. The method of clause 15, further comprising:
selecting a group of segments of the plurality of segments;

determining a second distance to reach the one or more of the desired velocities or the desired altitudes from a second waypoint of the plurality of waypoints, wherein the second waypoint is part of the group of segments;

determining a third distance between the second waypoint and a third waypoint of the plurality of waypoints, wherein the third waypoint is part of the group of segments;

adding a new waypoint to the group of segments based on the third distance being greater than the second distance; and setting the new waypoint as the one or more of the desired velocities or the desired altitudes.

Clause 20. The method of clause 15, further comprising:

selecting a group of segments of the plurality of segments;

determining that the waypoints of the group of segments cannot meet the flight profile without violating the constraint;

adding a new waypoint to the group of segments based on the group of segments not meeting the flight profile without violating the constraint; and setting the new waypoint to comply with the constraint.

Clause 21. The method of any one of clauses 15 to 20, further comprising:

iterating from a beginning of the flight path to an end of the flight path to adjust the plurality of waypoints; and iterating from the end of the flight path to the beginning of the flight path to adjust the plurality of waypoints.

Examples are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some can be different, to indicate more constituent signal paths, have a number label, to indicate a number of constituent signal paths, and/or have arrows at one or more ends, to indicate primary information flow direction. This, however, should not be construed in a limiting manner. Rather, such added detail can be used in connection with one or more exemplary examples to facilitate easier understanding of a circuit. Any represented signal lines, whether or not having additional information, can actually comprise one or more signals that can travel in multiple directions and can be implemented with any suitable type of signal scheme, e.g., digital or analog lines implemented with differential pairs, optical fiber lines, and/or single-ended lines.

Example sizes/models/values/ranges can have been given, although examples are not limited to the same. As manufacturing techniques (e.g., photolithography) mature over time, it is expected that devices of smaller size could be manufactured. In addition, well known power/ground connections to IC chips and other components can or cannot be shown within the figures, for simplicity of illustration and discussion, and so as not to obscure certain aspects of the examples. Further, arrangements can be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. Where specific details (e.g., circuits) are set forth in order to describe example examples, it should be apparent to one skilled in the art that examples can be practiced without, or with variation of, these specific details. The description is thus to be regarded as illustrative instead of limiting.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated. To the extent that terms "includes," "including," "has," "contains," and variants thereof are used herein, such terms are intended to be inclusive in a manner similar to the term "comprises" as an open transition word without precluding any additional or other elements.

As used in this application and in the claims, a list of items joined by the term "one or more of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. A system comprising:
a processor; and
a memory coupled to the processor, the memory including a set of instructions, which when executed by the processor, causes the system to:
identify a flight path, wherein the flight path includes a plurality of segments that each include a waypoint;
identify a flight profile that includes one or more of desired velocities or desired altitudes;
calculate a first horizontal distance from a beginning of the flight path to reach the one or more of the desired velocities or the desired altitudes to comply with a constraint associated with an aircraft;
identify a first waypoint from the plurality of segments based on the first horizontal distance; and
adjust the first waypoint to reach the one or more of the desired velocities or the desired altitudes.

2. The system of claim 1, wherein the first waypoint is disposed at a second horizontal distance from the beginning of the flight path, wherein the second horizontal distance is equal to or greater than the first horizontal distance,
wherein the instructions, when executed, cause the system to:
determine that a second waypoint of the plurality of waypoints is to be maintained based on a third horizontal distance between the second waypoint and the beginning of the flight path, wherein the third horizontal distance is less than the first horizontal distance; and
adjust a third waypoint of the plurality of waypoints to violate the constraint.

3. The system of claim 1, wherein the instructions, when executed, cause the system to:
select a group of segments of the plurality of segments, wherein the group of segments includes one or more waypoints of the plurality of waypoints; and
determine whether the group of segments are to be omitted for modification based on one or more of a length of the group of segments, the one or more of the waypoints meeting the one or more of the desired velocities or the desired altitudes, or an adjustment to the one or more of the waypoints to meet the one or more of the desired velocities or the desired altitudes results in a violation to the constraint.

4. The system of claim 1, wherein the instructions, when executed, cause the system to:
   select a group of segments of the plurality of segments;
   determine whether one or more of the segments of the group of segments violate the constraint; and
   adjust the one or more of the segments in response to the one or more of the segments violating the constraint.

5. The system of claim 1, wherein the instructions, when executed, cause the system to:
   select a group of segments of the plurality of segments;
   determine a second horizontal distance to reach the one or more of the desired velocities or the desired altitudes from a second waypoint of the plurality of waypoints, wherein the second waypoint is part of the group of segments;
   determine a third horizontal distance between the second waypoint and a third waypoint of the plurality of waypoints, wherein the third waypoint is part of the group of segments;
   add a new waypoint to the group of segments based on the third horizontal distance being greater than the second horizontal distance; and
   set the new waypoint as the one or more of the desired velocities or the desired altitudes.

6. The system of claim 1, wherein the instructions, when executed, cause the system to:
   select a group of segments of the plurality of segments;
   determine that one or more segments of the group of segments cannot meet the flight profile without violating the constraint;
   add a new waypoint to the group of segments based on the group of segments not meeting the flight profile without violating the constraint; and
   set the new waypoint to comply with the constraint.

7. The system of claim 1, wherein the instructions, when executed, cause the system to:
   iterate from the beginning of the flight path to an end of the flight path to adjust the plurality of waypoints; and
   iterate from the end of the flight path to the beginning of the flight path to adjust the plurality of waypoints.

8. At least one computer readable storage medium comprising a set of instructions, which when executed by a computing device, cause the computing device to:
   identify a flight path, wherein the flight path includes a plurality of segments that each include a waypoint;
   identify a flight profile that includes one or more of desired velocities or desired altitudes;
   calculate a first horizontal distance from a beginning of the flight path to reach the one or more of the desired velocities or the desired altitudes to comply with a constraint associated with an aircraft;
   identify a first waypoint from the plurality of segments based on the first horizontal distance; and
   adjust the first waypoint to reach the one or more of the desired velocities or the desired altitudes.

9. The at least one computer readable storage medium of claim 8, wherein the first waypoint is disposed at a second horizontal distance from the beginning of the flight path, wherein the second horizontal distance is equal to or greater than the first horizontal distance,
   wherein the instructions, when executed, cause the computing device to:
   determine that a second waypoint of the plurality of waypoints is to be maintained based on a third horizontal distance between the second waypoint and the beginning of the flight path, wherein the third horizontal distance is less than the first horizontal distance; and
   adjust a third waypoint of the plurality of waypoints to violate the constraint.

10. The at least one computer readable storage medium of claim 8, wherein the instructions, when executed, cause the computing device to:
    select a group of segments of the plurality of segments, wherein the group of segments includes one or more waypoints of the plurality of waypoints; and
    determine whether the group of segments are to be omitted for modification based on one or more of a length of the group of segments, the one or more of the waypoints meeting the one or more of the desired velocities or the desired altitudes, or an adjustment to the one or more of the waypoints to meet the one or more of the desired velocities or the desired altitudes results in a violation to the constraint.

11. The at least one computer readable storage medium of claim 8, wherein the instructions, when executed, cause the computing device to:
    select a group of segments of the plurality of segments;
    determine whether one or more of the segments of the group of segments violate the constraint; and
    adjust the one or more of the segments in response to the one or more of the segments violating the constraint.

12. The at least one computer readable storage medium of claim 8, wherein the instructions, when executed, cause the computing device to:
    select a group of segments of the plurality of segments;
    determine a second horizontal distance to reach the one or more of the desired velocities or the desired altitudes from a second waypoint of the plurality of waypoints, wherein the second waypoint is part of the group of segments;
    determine a third horizontal distance between the second waypoint and a third waypoint of the plurality of waypoints, wherein the third waypoint is part of the group of segments;
    add a new waypoint to the group of segments based on the third horizontal distance being greater than the second horizontal distance; and
    set the new waypoint as the one or more of the desired velocities or the desired altitudes.

13. The at least one computer readable storage medium of claim 8, wherein the instructions, when executed, cause the computing device to:
    select a group of segments of the plurality of segments;
    determine that the waypoints of the group of segments cannot meet the flight profile without violating the constraint;
    add a new waypoint to the group of segments based on the group of segments not meeting the flight profile without violating the constraint; and
    set the new waypoint to comply with the constraint.

14. The at least one computer readable storage medium of claim 8, wherein the instructions, when executed, cause the computing device to:
    iterate from the beginning of the flight path to an end of the flight path to adjust the plurality of waypoints; and
    iterate from the end of the flight path to the beginning of the flight path to adjust the plurality of waypoints.

15. A method for controlling at least one aircraft comprising:

identifying a flight path, wherein the flight path includes a plurality of segments that each include a waypoint;

identifying a flight profile that includes one or more of desired velocities or desired altitudes;

calculating a first horizontal distance from a beginning of the flight path to reach the one or more of the desired velocities or the desired altitudes to comply with a constraint associated with the at least one aircraft;

identifying a first waypoint from the plurality of segments based on the first horizontal distance; and adjusting the first waypoint to reach the one or more of the desired velocities or the desired altitudes.

16. The method of claim 15, wherein the first waypoint is disposed at a second horizontal distance from the beginning of the flight path, wherein the second horizontal distance is equal to or greater than the first horizontal distance, the method further comprising:

determining that a second waypoint of the plurality of waypoints is to be maintained based on a third horizontal distance between the second waypoint and the beginning of the flight path, wherein the third horizontal distance is less than the first horizontal distance; and adjusting a third waypoint of the plurality of waypoints to violate the constraint.

17. The method of claim 15 further comprising:

selecting a group of segments of the plurality of segments, wherein the group of segments includes one or more waypoints of the plurality of waypoints; and determining whether the group of segments are to be omitted for modification based on one or more of a length of the group of segments, the one or more of the waypoints meeting the one or more of the desired velocities or the desired altitudes, or an adjustment to the one or more of the waypoints to meet the one or more of the desired velocities or the desired altitudes results in a violation to the constraint.

18. The method of claim 15 further comprising:

selecting a group of segments of the plurality of segments;

determining whether one or more of the segments of the group of segments violate the constraint; and adjusting the one or more of the segments in response to the one or more of the segments violating the constraint.

19. The method of claim 15, further comprising:

selecting a group of segments of the plurality of segments;

determining a second horizontal distance to reach the one or more of the desired velocities or the desired altitudes from a second waypoint of the plurality of waypoints, wherein the second waypoint is part of the group of segments;

determining a third horizontal distance between the second waypoint and a third waypoint of the plurality of waypoints, wherein the third waypoint is part of the group of segments;

adding a new waypoint to the group of segments based on the third horizontal distance being greater than the second horizontal distance; and setting the new waypoint as the one or more of the desired velocities or the desired altitudes.

20. The method of claim 15, further comprising:

selecting a group of segments of the plurality of segments;

determining that the waypoints of the group of segments cannot meet the flight profile without violating the constraint;

adding a new waypoint to the group of segments based on the group of segments not meeting the flight profile without violating the constraint; and setting the new waypoint to comply with the constraint.

* * * * *